United States Patent
Kobayashi et al.

(10) Patent No.: US 6,731,780 B2
(45) Date of Patent: May 4, 2004

(54) FINGERPRINT IMAGE JUDGMENT APPARATUS AND PROGRAM

(75) Inventors: Kazuo Kobayashi, Saitama (JP); Hiroyuki Tsuji, Kanagawa (JP); Miyuki Iizuka, Kanagawa (JP)

(73) Assignee: NTT Electronics Corporation, Tokyo (JP)

( * ) Notice: Subject to any disclaimer, the term of this patent is extended or adjusted under 35 U.S.C. 154(b) by 0 days.

(21) Appl. No.: 10/329,590

(22) Filed: Dec. 26, 2002

(65) Prior Publication Data

US 2003/0118220 A1 Jun. 26, 2003

(30) Foreign Application Priority Data

Dec. 25, 2001 (JP) ...................... P2001-392748

(51) Int. Cl.[7] .................................................. G06K 9/00
(52) U.S. Cl. ....................................................... 382/124
(58) Field of Search ............................... 382/124, 125, 382/126, 193, 199; 356/71

(56) References Cited

U.S. PATENT DOCUMENTS 4,872,203 A * 10/1989 Asai et al. ...................... 382/4
5,963,656 A * 10/1999 Bolle et al. .................. 382/124
6,212,290 B1 * 4/2001 Gagne et al. ................ 382/125
2002/0021827 A1 * 2/2002 Smith .......................... 382/124
2002/0181749 A1 * 12/2002 Matsumoto et al. ........ 382/125

FOREIGN PATENT DOCUMENTS

JP          05-266171 A   * 10/1993   ........... G06F/15/62

* cited by examiner

*Primary Examiner*—Andrew W. Johns
(74) *Attorney, Agent, or Firm*—Brenda O. Holmes; Kilpatrick Stockton LLP (57) ABSTRACT

A fingerprint image judgment apparatus is capable of judging whether or not fingerprint image data has been correctly read when a CPU having a small utilizable memory space is used. A first count unit counts the number of ridges or valleys in one direction of an X-axis direction or a Y-axis direction based on the pixel values stored in the first memory $14_1$. A second count unit counts the number of ridges or valleys in the other direction of the X-axis direction or the Y-axis direction based on a judgment result h_flg [i] stored in a second memory $14_2$ and the pixel values stored in the first memory $14_1$. The judgment result h_flg [i] indicates whether or not the pixel values form ridges or valleys in the one direction. A correctibility judgment unit judges whether or not the fingerprint image data has been correctly read by the fingerprint sensor 15 based on the number of ridges or the valleys counted by the first and second count units.

12 Claims, 10 Drawing Sheets

FIG. 10

FINGERPRINT IMAGE JUDGMENT APPARATUS AND PROGRAM

CROSS REFERENCE TO RELATED APPLICATIONS

This application is based upon and claims the benefit of priority from the prior Japanese Patent Applications No. P2001-392748, filed on Dec. 25, 2001; the entire contents of which are incorporated herein by reference.

BACKGROUND OF THE INVENTION

1. Field of the Invention

The present invention relates to a fingerprint image judgment apparatus which judges whether or not fingerprint image data is correctly read and to program thereof.

2. Description of the Related Art

Figure 1:
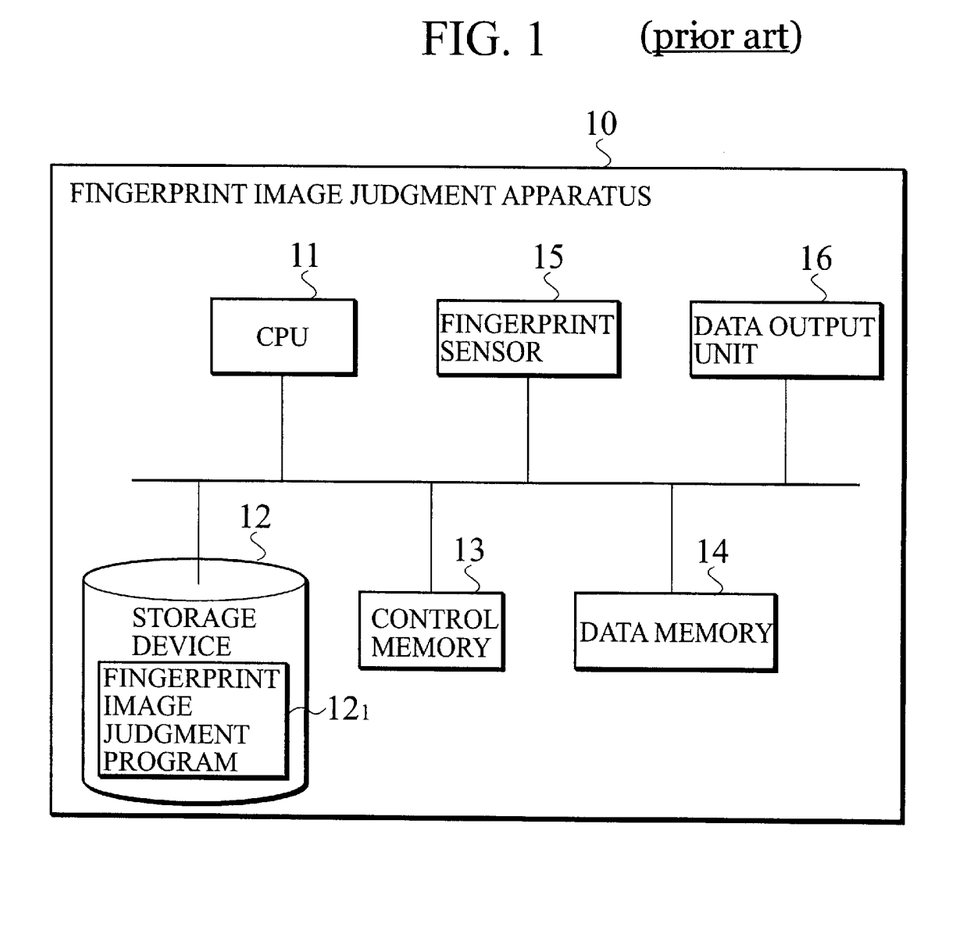
FIG. 1 is a hardware configuration view of a fingerprint image judgment apparatus according to a prior art.

A conventional fingerprint image judgment apparatus 10 will be described with reference to FIGS. 1 to 5. FIG. 1 is a hardware configuration view of the conventional fingerprint image judgment apparatus 10.

The conventional fingerprint image judgment apparatus 10 reads a fingerprint image as digital data (fingerprint image data) by use of a fingerprint sensor 15, and outputs the fingerprint image data, which is judged to have been correctly read, to an external device (not shown) by means of a data output unit 16. "Fingerprint image data" is composed of a plurality of pixel values.

As shown in FIG. 1, the conventional fingerprint image judgment apparatus 10 includes a CPU 11, a storage device 12, a control memory 13, a data memory 14, the fingerprint sensor 15 and the data output unit 16.

The CPU 11 is a central processing unit for interpreting and executing a fingerprint image judgment program $12_1$ stored in the storage device 12. The storage device 12 is a unit for storing the fingerprint image judgment program $12_1$.

The control memory 13 and the data memory 14 are where the various data is temporarily stored in order for the CPU 11 to execute the fingerprint image judgment program $12_1$. The entire fingerprint image data read by use of the fingerprint sensor 15 is stored temporarily in the data memory 14. In the case of using the fingerprint sensor 15 that reads fingerprint image data of, for example, 256 pixels in the X-axis direction and 256 pixels in the Y-axis direction, a data memory 14 having a memory size equivalent to 64 KB (256×256=64K) is necessary. Herein, contrast information (pixel values) related to a fingerprint image of one pixel is expressed by one byte. Moreover, the pixel value is expressed by a value in a range of "0" to "255". When the fingerprint image of one pixel is "black", the pixel value is "0". Meanwhile, when the fingerprint image of one pixel is "white", the pixel value is "255".

The fingerprint sensor 15 is a device that reads the fingerprint image as the digital data (fingerprint image data) for every line in the X-axis direction (or Y-axis direction) and stores the read fingerprint image data in the data memory 14.

Figure 2:
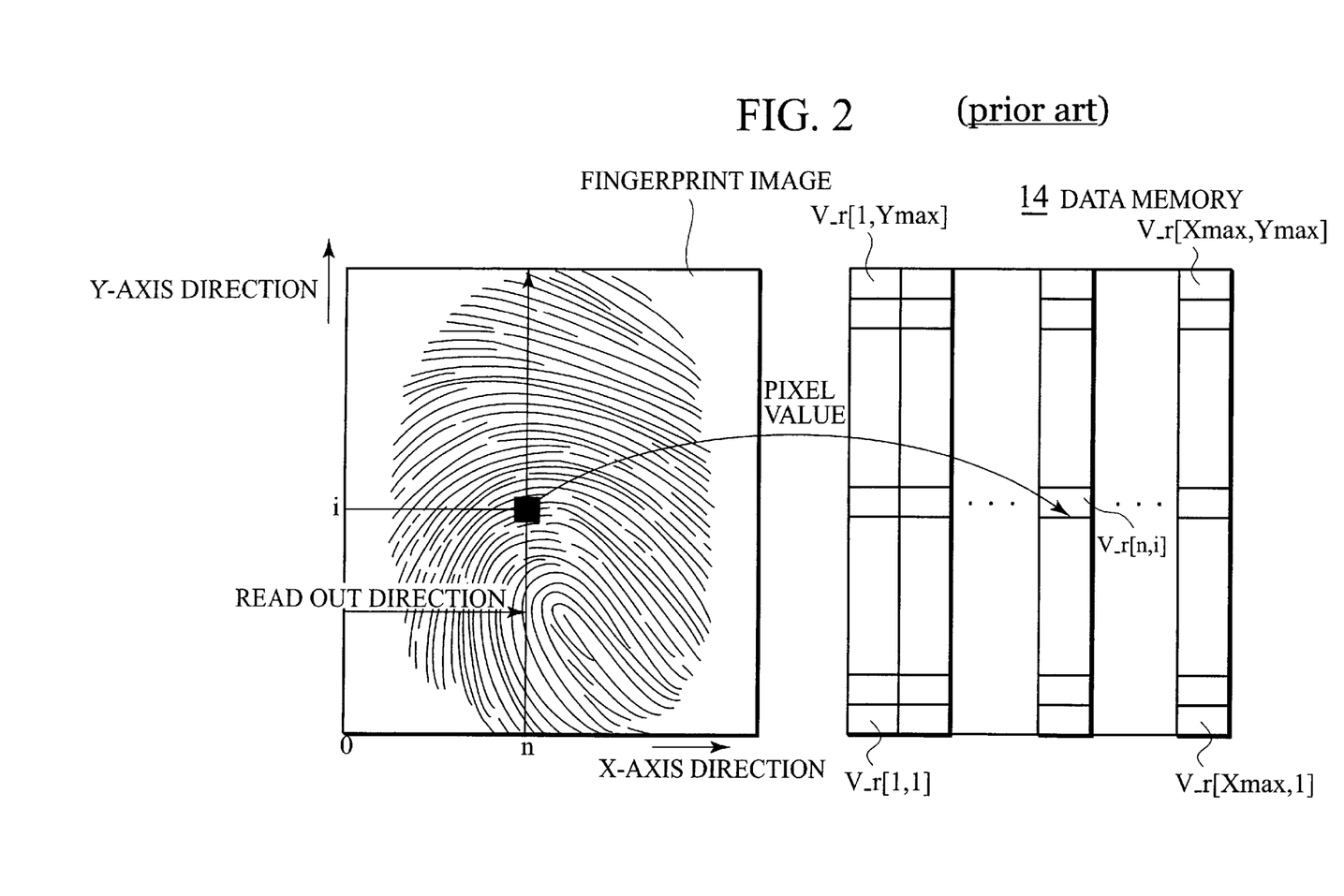
FIG. 2 is a view showing where, in the fingerprint image judgment apparatus according to the prior art, a fingerprint sensor reads fingerprint image data (pixel values) for each line in a Y-axis direction and stores the data in a data memory.

FIG. 2 shows a state whereby the fingerprint sensor 15 reads the fingerprint image data for every line in the Y-axis direction and stores the read fingerprint image data (a plurality of pixel values) in the data memory 14.

In FIG. 2, the fingerprint sensor 15 reads a pixel value at a coordinate position of (X, Y)=(n, i) and stores the read pixel value at an address position of V_r [n, i] in the data memory 14.

In FIG. 2, since the fingerprint sensor 15 that reads fingerprint image data (a plurality of pixel values) of $X_{max}$ pixels in the X-axis direction and $Y_{max}$ pixels in the Y-axis direction is used, the data memory 14 having a memory size of ($X_{max} \times Y_{max}$) bytes or more is used.

The data output unit 16 is a unit that outputs the fingerprint image data to the external device (not shown). The fingerprint image data is the data judged to have been correctly read by the fingerprint image judgment program $12_1$ executed by the CPU 11.

Figure 3:
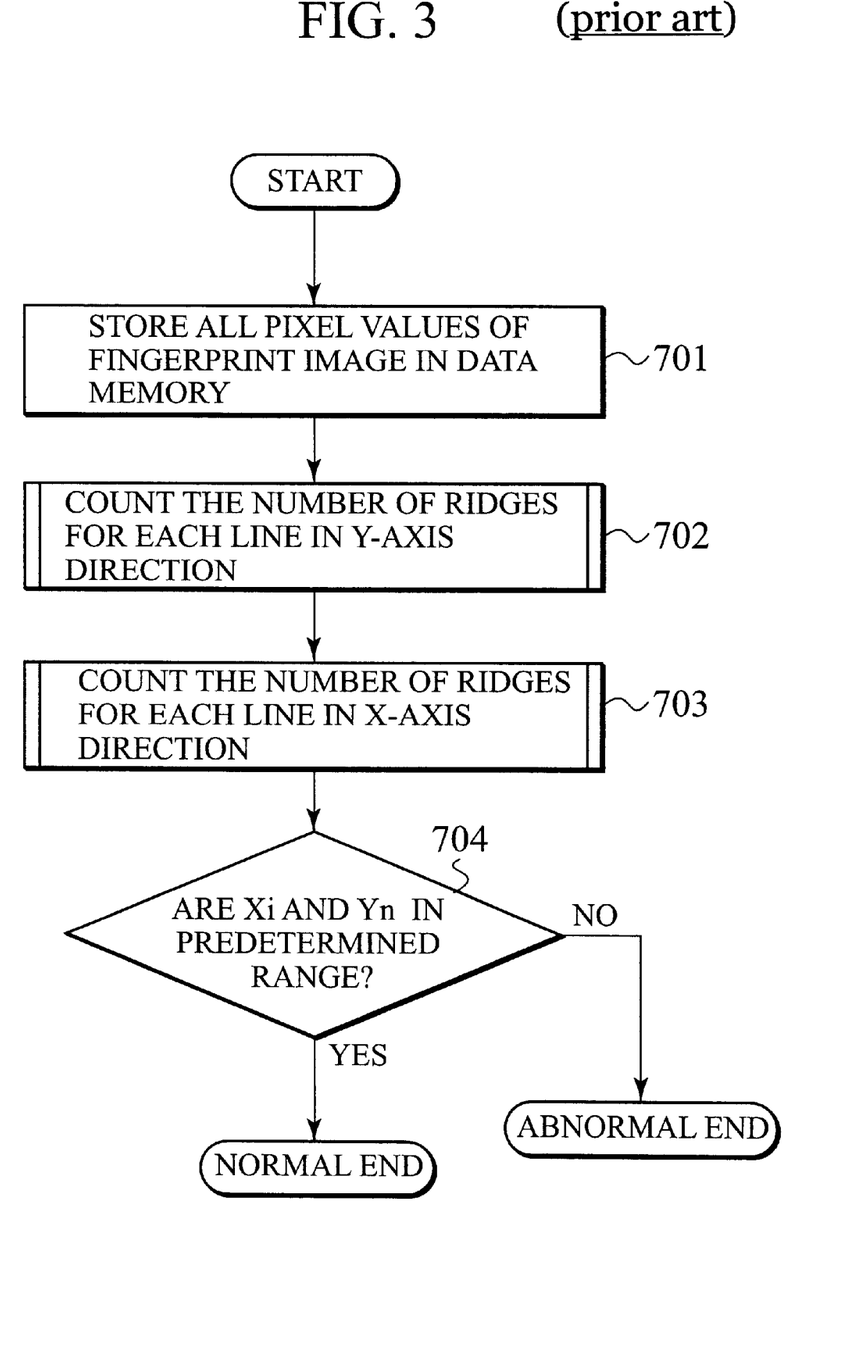
FIG. 3 is a flowchart illustrating an operation in which the fingerprint image judgment apparatus according to the prior art judges whether or not the fingerprint image data has been correctly read.
Figure 4:
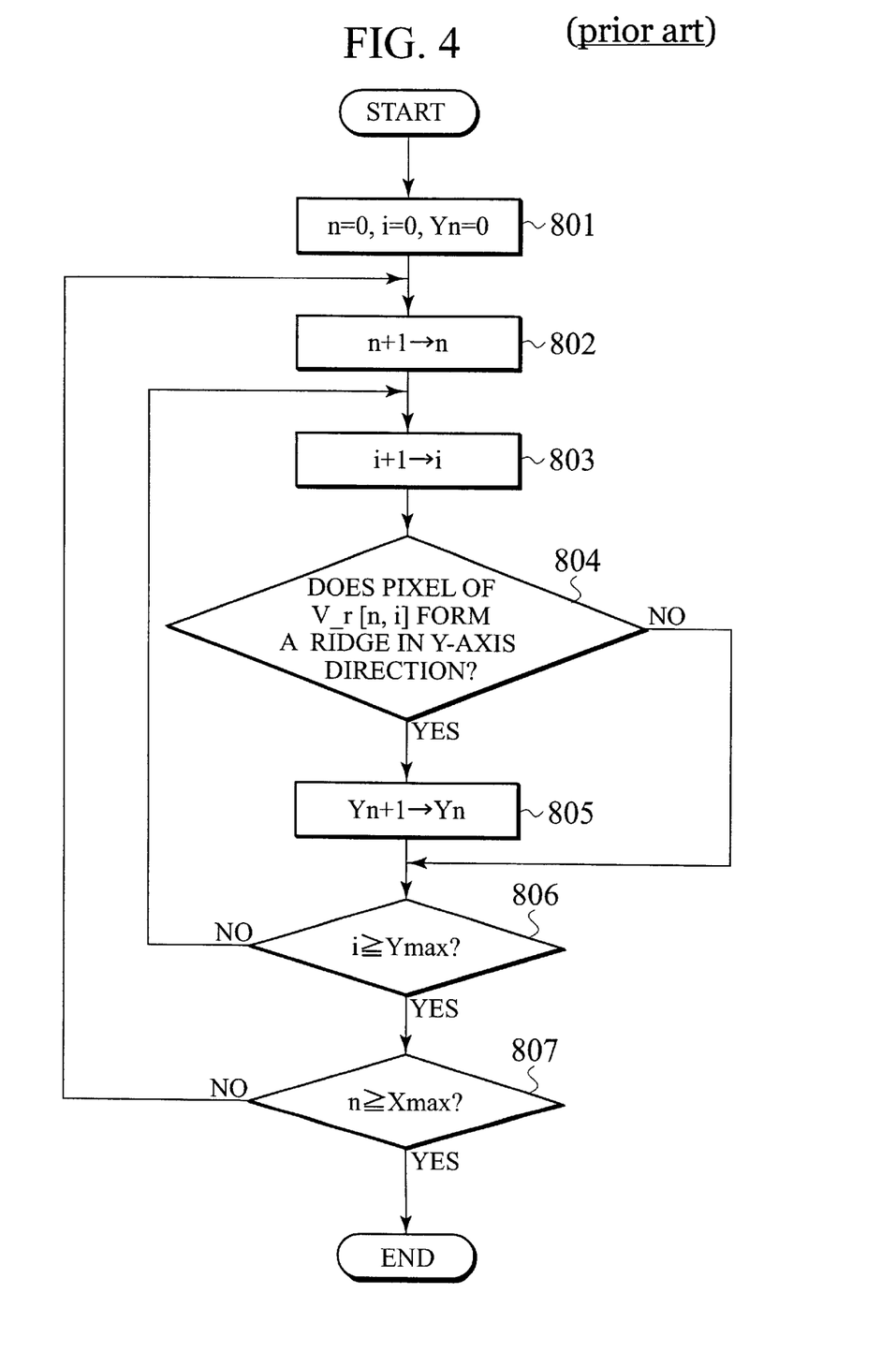
FIG. 4 is a flowchart illustrating an operation of counting the number of ridges in a fingerprint image along all lines in the Y-axis direction in the fingerprint image judgment apparatus according to the prior art.
Figure 5:
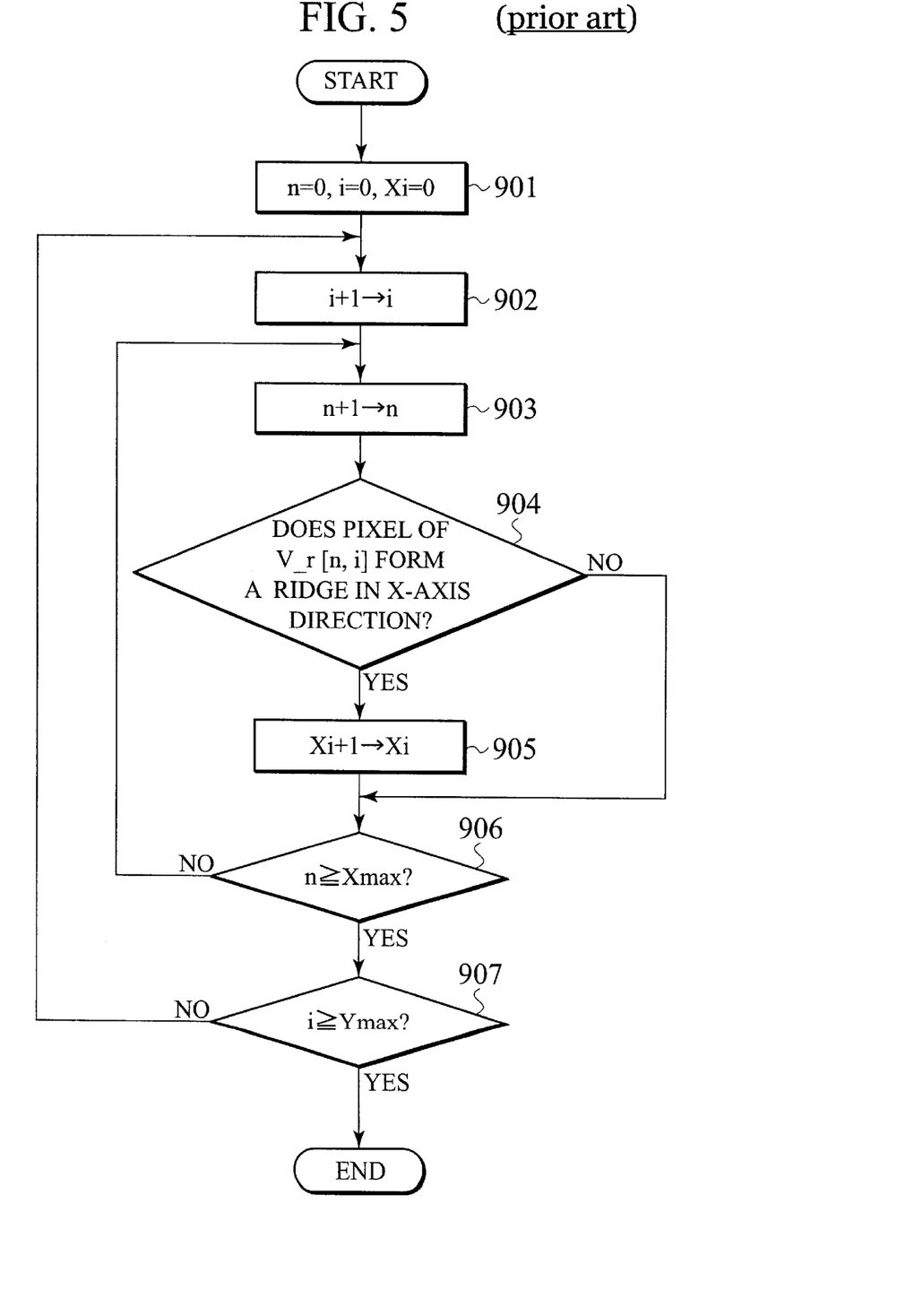
FIG. 5 is a flowchart illustrating an operation of counting the number of ridges in a fingerprint image along all lines in an X-axis direction in the fingerprint image judgment apparatus according to the prior art.

FIGS. 3 to 5 are flowcharts illustrating an operation for judging, by the fingerprint image judgment program $12_1$, whether or not the fingerprint image data has been correctly read.

In step 701, the fingerprint sensor 15 stores all pixel values of the read fingerprint image data at the predetermined address position V_r [n, i] of the data memory 14. Herein, a variable "n" is a value in a range of 1 to $X_{max}$, and a variable "i" is a value in a range of 1 to $Y_{max}$.

In step 702, the fingerprint image judgment program $12_1$ counts the number of ridges in the fingerprint image along all the lines in the Y-axis direction, and substitutes the number for the variable "$Y_n$". In step 703, the fingerprint image judgment program $12_1$ counts the number of ridges in the fingerprint image along all the lines in the X-axis direction, and substitutes the number for the variable "$X_i$".

In step 704, the fingerprint image judgment program $12_1$ judges whether or not the values of the variables "$Y_n$" and "$X_i$" are values in the predetermined range.

Specifically, when the values of the variables "$Y_n$" and "$X_i$" are in the predetermined range, the fingerprint image data is judged to have been correctly read by the fingerprint sensor 15 (normal end).

On the other hand, when the values of the variables "$Y_n$" and "$X_i$" are not in the predetermined range, the fingerprint image data is judged not to have been correctly read by the fingerprint sensor 15 (abnormal end).

In FIG. 4, a description will be made in detail for the operation (step 702) in which the fingerprint image judgment program $12_1$ counts the number of ridges in the fingerprint image along all the lines in the Y-axis direction and substitutes the number for the variable $Y_n$".

In step 801, the fingerprint image judgment program $12_1$ substitutes the value "0" for the variables "n", "i" and "$Y_n$" (initialization). In step 802, the fingerprint image judgment program $12_1$ increases the value of the variable "n" by only "1". In step 803, the fingerprint image judgment program $12_1$ increases the value of the variable "i" by only "1".

In step 804, the fingerprint image judgment program $12_1$ judges whether or not the pixel at the address position V_r [n, i] of the data memory 14 forms a ridge in the Y-axis direction. For example, a threshold value indicating a boundary between a ridge and a valley has been set previously. When the pixel value at the address position V_r [n,i−1] is equal to or more than the threshold value and the pixel value at the address position V_r [n, i] is less than the threshold value, the fingerprint image judgment program $12_1$ judges that the pixel at the address position V_r [n, i] forms a ridge in the Y-axis direction.

When it is judged that the pixel at the address position V_r [n, i] of the data memory 14 forms a ridge in the Y-axis direction (YES), the process advances to step 805. Meanwhile, it is judged that the pixel at the address position V_r [n, i] of the data memory 14 does not form a ridge in the Y-axis direction (NO), the process advances to step 806.

In step 805, the fingerprint image judgment program 12₁ increases the value of the variable "$Y_n$" by 1. In step 806, the fingerprint image judgment program 12₁ judges whether or not the variable "i" is equal to or more than the value "$Y_{max}$".

When the variable "i" is equal to or more than the value "$Y_{max}$", the fingerprint image judgment program 12₁ judges that the count of the number of ridges for the $n^{th}$ line in the Y-axis direction is finished, and the process advances to step 807.

Meanwhile, when the variable "i" is less than the value "$Y_{max}$", the fingerprint image judgment program 12₁ judges that the count of the number of ridges for the $n^{th}$ line in the Y-axis direction is not finished, and the operations from step 803 to step 805 are repeated for the $n^{th}$ line in the Y-axis direction.

In step 807, the fingerprint image judgment program 12₁ judges whether or not the variable "n" is equal to or more than the value "$X_{max}$".

When the variable "n" is equal to or more than the value "$X_{max}$"(YES) in step 807, the fingerprint image judgment program 12₁ judges that the count of the number of ridges for all the pixels in the Y-axis direction along all the lines in the Y-axis direction is finished, and this operation is finished. As a result, the variable "$Y_n$" of $X_{max}$, which indicates the number of ridges for one line in the Y-axis direction in the fingerprint image, is obtained.

On the other hand, when the variable "n" is less than the value "$X_{max}$" (NO), the fingerprint image judgment program 12₁ judges that the count of the number of ridges for the pixels in the Y-axis direction along all the lines in the Y-axis direction is not finished. Then, the operations from step 803 to step 805 are repeated for the $(n+1)^{th}$ line in the Y-axis direction.

In FIG. 5, a description will be made in detail for the operation (step 703) in which the fingerprint image judgment program 12₁ counts the number of ridges in the fingerprint image for all the lines in the X-axis direction and substitutes the number for the variable "$X_i$".

In step 901, the fingerprint image judgment program 12₁ substitutes the value "0" for the variables "n", "i" and "$Y_n$" (initialization). In step 902, the fingerprint image judgment program 12₁ increases the value of the variable "i" by 1. In step 903, the fingerprint image judgment program 12₁ increases the value of the variable "n" by 1.

In step 904, the fingerprint image judgment program 12₁ judges whether or not the pixel at the address position V_r [n, i] of the data memory 14 forms a ridge in the X-axis direction. For example, a threshold value indicating a boundary between a ridge and a valley has been set previously. When the pixel value at the address position V_r [n−1, i] is equal to or more than the threshold value and the pixel value at the address position V_r [n, i] is less than the threshold value, the fingerprint image judgment program 12₁ judges that the pixel at the address position V_r [n, i] forms the ridge in the X-axis direction.

When it is judged that the pixel at the address position V_r [n, i] of the data memory 14 forms the ridge in the X-axis direction (YES), the operation advances to step 905. Meanwhile, it is judged that the pixel at the address position V_r [n, i] of the data memory 14 does not form the ridge in the X-axis direction (NO), the operation advances to step 906.

In step 905, the fingerprint image judgment program 12₁ increases the value of the variable "$X_i$" by only "1".

In step 906, the fingerprint image judgment program 12₁ judges whether or not the variable "n" is equal to or more than the value "$X_{max}$" (YES).

When the variable "n" is equal to or more than the value "$X_{max}$", the fingerprint image judgment program 12₁ judges that the count of ridges for all the pixels in the X-axis direction along the $i^{th}$ line in the X-axis direction is finished, and the process advances to step 907.

Meanwhile, when the variable "n" is less than the value "$X_{max}$" (NO), the fingerprint image judgment program 12₁ judges that the count of ridges for all the pixels in the X-axis direction along the $i^{th}$ line in the X-axis direction is not finished, and the operations from step 903 to step 905 are repeated for the $i^{th}$ line in the X-axis direction.

In step 907, the fingerprint image judgment program 12₁ judges whether or not the variable "i" is equal to or more than the numeric value "$Y_{max}$". When the variable "i" is equal to or more than the numeric value "$Y_{max}$" (YES), the fingerprint image judgment program 12₁ judges that the count of the number of ridges for all the pixels in the X-axis direction along all the lines in the X-axis direction is finished, and this operation is finished. As a result, the variables "$X_i$" of $Y_{max}$, which indicates the number of ridges for one line in the X-axis direction in the fingerprint image, are obtained.

On the other hand, when the variable "i" is less than the numeric value "$Y_{max}$" (NO), the fingerprint image judgment program 12₁ judges that the count of the ridges for the pixels in the X-axis direction along all the lines in the X-axis direction is not finished. Then, the operations from step 903 to step 905 are repeated for the $(i+1)^{th}$ line in the X-axis direction.

However, in the case of using an inexpensive CPU 11 (for example, an 8-bit CPU and the like) in the conventional fingerprint image judgment apparatus 10, there is a problem in that utilizable memory space is reduced (to, for example, 64 KB or less) and thus the entire fingerprint image data read by use of the fingerprint sensor 15 cannot be temporarily stored therein.

BRIEF SUMMARY OF THE INVENTION

The present invention was made in consideration of the above problem. An object of the present invention is to provide a fingerprint image judgment apparatus and program thereof, which enable judgment of whether or not fingerprint image data has been correctly read even in the case of using a CPU with a small utilizable memory space.

A first aspect of the present invention is summarized as a fingerprint image judgment apparatus which judges whether or not fingerprint image data composed of a plurality of pixel values indicating contrast information of pixels has been correctly read by a fingerprint sensor, comprising a first memory, a formation judgment unit, a second memory, a storage unit, a first count unit, a second count unit, and a correctibility judgment unit. The first memory stores the pixels values of a predetermined number. The formation judgment unit judges whether or not the pixel values form any one of ridges and valleys in any one direction of the X-axis and Y-axis directions in the fingerprint image data. The second memory stores a judgment result judged by the formation judgment unit. The storage unit sequentially stores the pixel values of the fingerprint image data in the first memory at intervals of a predetermined number. The fingerprint image data is read by the fingerprint sensor along one of the directions. The first count unit counts any one of the number of ridges and valleys in said one of the directions based on the pixel values stored in the first memory. The second count unit counts any one of the number of ridges and valleys in the other direction of the X-axis and Y-axis directions based on the judgment result stored in the second memory and the pixel values stored in the first memory. The correctibility judgment unit judges whether or not the fingerprint image data has been correctly read by the fingerprint sensor based on any one of the number of ridges and valleys counted by the first count unit and any one of the number of ridges and valleys counted by the second count unit with respect to the entire fingerprint image data.

In the first aspect of the present invention, preferably, the first memory stores the pixel values for one line in said one of the directions, the second memory stores the judgment result for one line in said one of the directions, the storage unit sequentially stores the pixel values in the first memory for each line in said one of the directions, and the first count unit counts any one of the number of ridges and valleys in said one of the directions along each line in said one of the directions.

In the first aspect of the present invention, preferably, the storage unit sequentially stores the pixel values in the first memory for each pixel along said one of the directions, the first count unit counts any one of the number of ridges and valleys in said one of the directions for each pixel, and the second count unit counts any one of the number of ridges and valleys in said other direction for each pixel.

In the first aspect of the present invention, preferably, the formation judgment unit judges whether or not the pixel values form any one of ridges and valleys in any one direction of the X-axis and Y-axis directions in the fingerprint image data, by comparing the pixel values stored in the first memory with a first threshold value.

In the first aspect of the present invention, preferably, the second count unit increases the number of ridges in said other direction by 1, in the case where the judgment result stored in the second memory forms a valley and where the pixel values stored in the first memory are less than a second threshold value.

In the first aspect of the present invention, preferably, the second count unit increases the number of valleys in said other direction by 1, in the case where the judgment result stored in the second memory forms a ridge and where the pixel values stored in the first memory are equal to or more than a second threshold value.

A second aspect of the present invention is summarized as a program product for allowing a computer to function as a fingerprint image judgment apparatus which judges whether or not fingerprint image data composed of a plurality of pixel values indicating contrast information of pixels has been correctly read by a fingerprint sensor, comprising a formation judgment unit, a storage unit, a first count unit, a second count unit, and a correctibility judgment unit. The formation judgment unit judges whether or not the pixel values stored in a first memory form any one of ridges and valleys in any one direction of the X-axis and Y-axis directions in the fingerprint image data and for storing the judgment result in a second memory. The storage unit sequentially stores the pixel values of the fingerprint image data in the first memory at intervals of a predetermined number. The fingerprint image data is read by the fingerprint sensor along said one of the directions. The first count unit counts any one of the number of ridges and valleys in said one of the directions based on the pixel values stored in the first memory. The second count unit counts any one of the number of ridges and valleys in the other direction of the X-axis and Y-axis directions based on the judgment result stored in the second memory and the pixel values stored in the first memory. The correctibility judgment unit judges whether or not the fingerprint image data has been correctly read by the fingerprint sensor based on any one of the number of ridges and valleys counted by the first count unit and any one of the number of ridges and valleys counted by the second count unit with respect to the entire fingerprint image data.

DETAILED DESCRIPTION OF THE INVENTION

Figure 6:
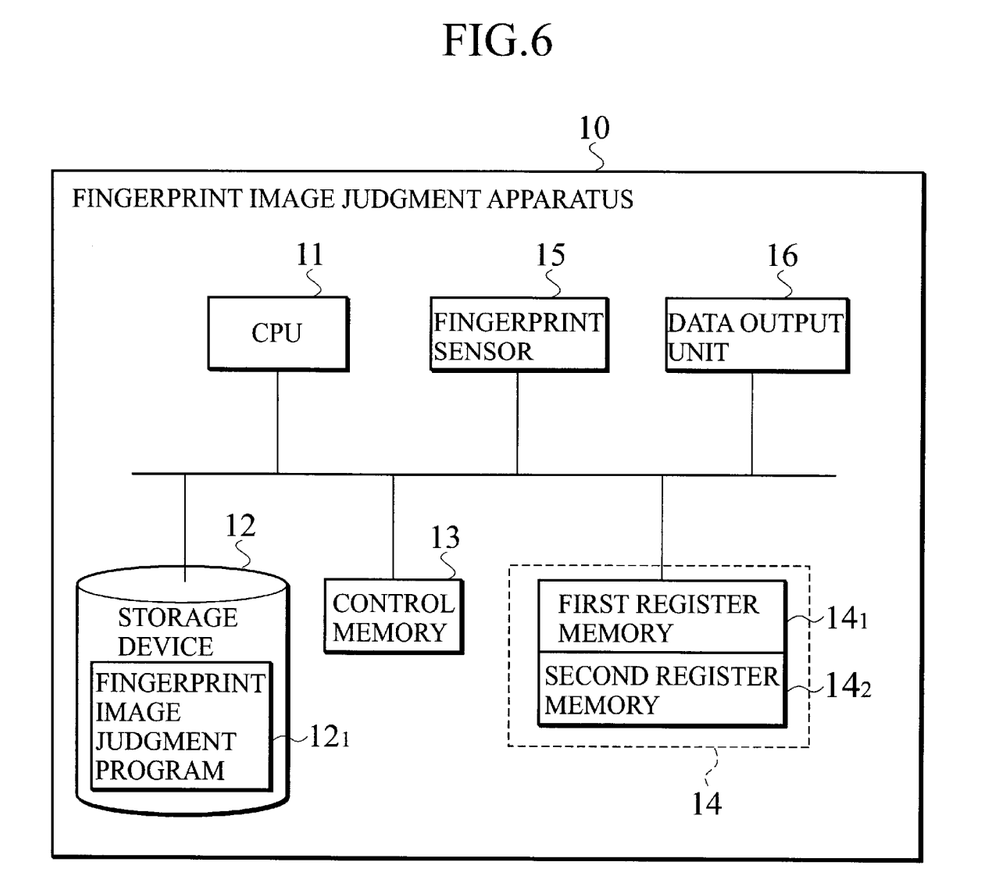
FIG. 6 is a hardware configuration view of a fingerprint image judgment apparatus according to one embodiment of the present invention.

Configuration of a Fingerprint Image Judgment Apparatus According to One Embodiment of the Present Invention A configuration of a fingerprint image judgment apparatus 10 according to one embodiment of the present invention will be described by referring to the drawings. FIG. 6 is a hardware configuration view of a fingerprint image judgment apparatus 10 according to this embodiment.

Similar to the conventional fingerprint image judgment apparatus 10, the fingerprint image judgment apparatus 10 of this embodiment judges whether or not the fingerprint image data has been correctly read by a fingerprint sensor 15, the fingerprint image data being composed of a plurality of pixel values indicating contrast information of pixels.

As shown in FIG. 6, the hardware configuration of the fingerprint image judgment apparatus 10 of this embodiment is the same as that of the conventional fingerprint image judgment apparatus 10 except that a data memory 14 is divided into a first register memory $14_1$ and a second register memory $14_2$. Hereinafter, a description will be made of the hardware configuration of the fingerprint image judgment apparatus 10 of this embodiment, mainly of differences between the hardware configuration of the fingerprint judgment apparatus 10 of the embodiment and that of the conventional one.

In this embodiment, the first register memory $14_1$ constitutes a first memory for storing pixel values of a predetermined number, and the second register memory $14_2$ constitutes a second memory for storing a judgment result judged by a formation judgment unit.

Moreover, a fingerprint image judgment program $12_1$ stored in a storage device 12 constitutes the formation judgment unit which judges whether or not the pixel values form ridges or valleys in any one direction of the X-axis and Y-axis directions in fingerprint image data.

The fingerprint image judgment program $12_1$ constitutes a storage unit which sequentially stores the pixel values of the fingerprint image data in the first memory at intervals of a predetermined number, the fingerprint image data being read by the fingerprint sensor along one of the aforementioned directions.

The fingerprint image judgment program $12_1$ also constitutes a first count unit which counts the number of ridges or valleys in one of the aforementioned directions based on the pixel values stored in the first memory.

The fingerprint image judgment program $12_1$ also constitutes a second count unit which counts the number of ridges or valleys in the other direction of the X-axis and Y-axis directions based on the judgment result stored in the second memory and the pixel values stored in the first memory.

Furthermore, the fingerprint image judgment program $12_1$ also constitutes a correctibility judgment unit which judges whether or not the fingerprint image data has been correctly read by the fingerprint sensor based on the number of ridges or valleys which have been counted by the first count unit for the entire fingerprint image data and the number of ridges or valleys which have been counted by the second count unit.

The first register memory $14_1$ is where the pixel values of the fingerprint image data along one line in the Y-axis direction (the pixel values of the predetermined number) is temporarily stored, the fingerprint image data being read by use of the fingerprint sensor 15.

The second register memory $14_2$ is where a flag h_flg [i] (judgment result) indicating whether or not each pixel of the fingerprint image data for one line in the Y-axis direction forms a valley is temporarily stored, the fingerprint image data being read by use of the fingerprint sensor 15.

Figure 7:
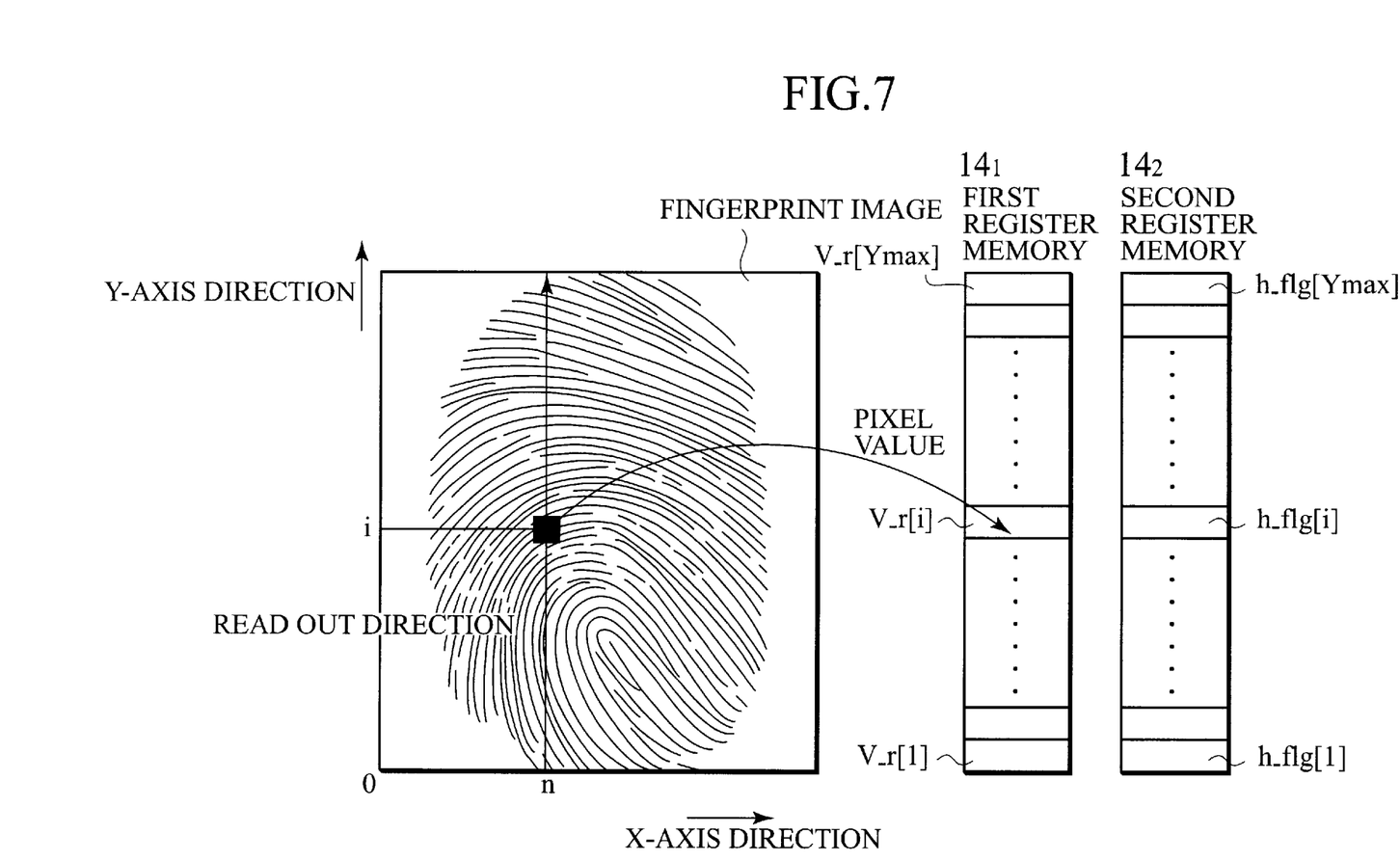
FIG. 7 is a view showing where, in the fingerprint image judgment apparatus according to the embodiment of the present invention, a fingerprint sensor reads fingerprint image data (pixel values) for each line in a Y-axis direction and stores the data in a data memory.

FIG. 7 is a view showing a state whereby the fingerprint sensor 15 reads the fingerprint image data for each line in the Y-axis direction and stores the read fingerprint image data (a plurality of pixel values) in the first register memory $14_1$.

In FIG. 7, the fingerprint sensor 15 reads a pixel value at the coordinate position of (X, Y)=(n, i) and stores the read pixel value at an address position V_r [i] on the first register memory $14_1$. In this event, in the second register memory $14_2$, a flag h_flg [i] for each pixel of the $(n-1)^{th}$ line in the Y-axis direction is stored.

In FIG. 7, since the fingerprint sensor 15 which reads the fingerprint image data (a plurality of pixel values) of $Y_{max}$ pixels in the Y-axis direction is used, the first and second register memories $14_1$ and $14_2$ having a memory size of $Y_{max}$ bytes or more, respectively, are used.

Figure 8:
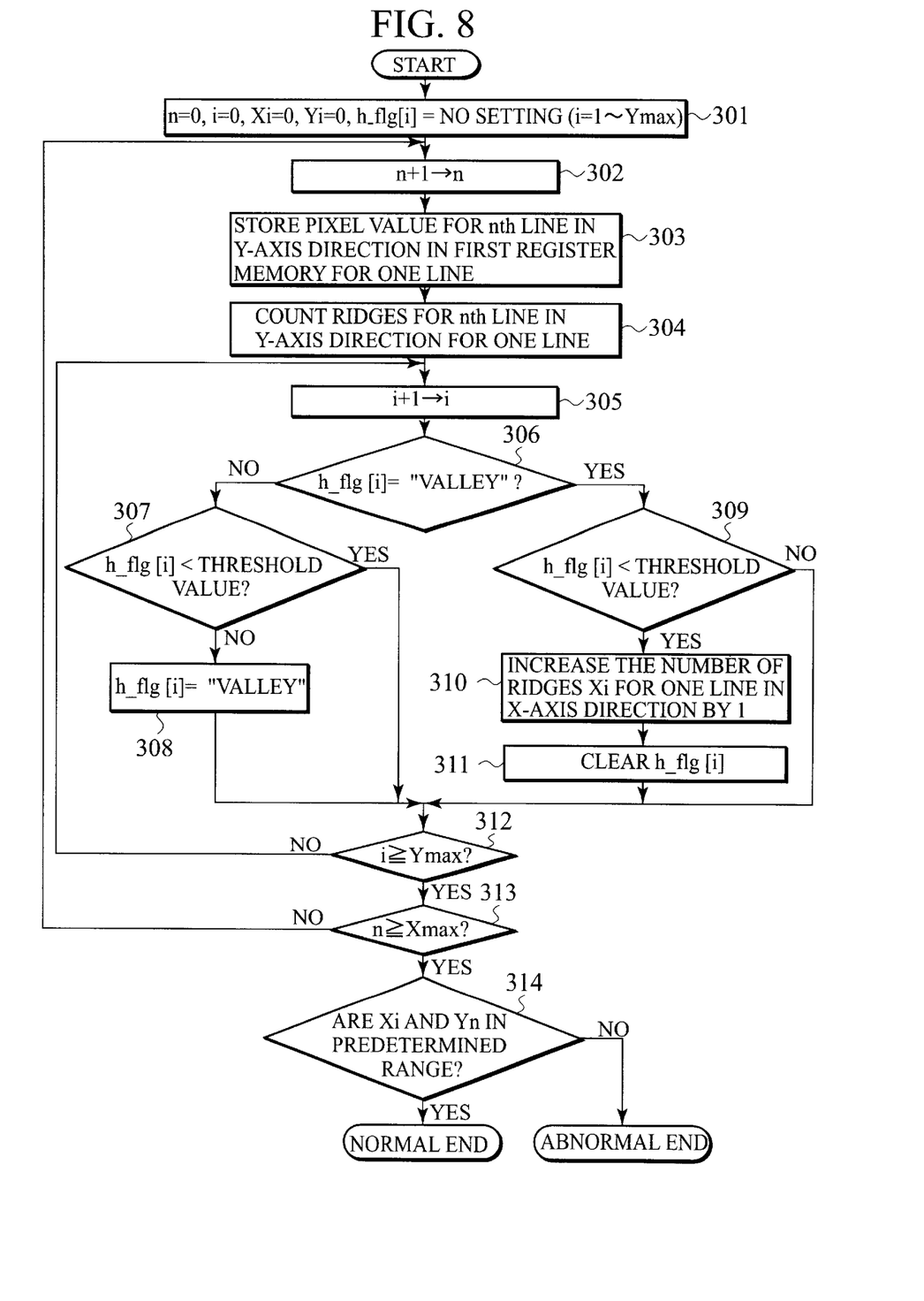
FIG. 8 is a flowchart illustrating an operation in which the fingerprint image judgment apparatus according to the embodiment of the present invention judges whether or not the fingerprint image data has been correctly read.

Operation of the Fingerprint Image Judgment Apparatus 10 According to This Embodiment An operation of the fingerprint image judgment apparatus 10 according to this embodiment will be described with reference to the drawings. FIG. 8 is a flowchart illustrating an operation in which the fingerprint image judgment apparatus 10 according to this embodiment judges whether or not the fingerprint image data has been correctly read.

As shown in FIG. 8, in step 301, the fingerprint image judgment program $12_1$ initializes variables "n", "i", "$X_i$", "$Y_n$" and "h_flg [i]".

To be specific, the fingerprint image judgment program $12_1$ substitutes a numeral value "0" for "n", "i", "$X_i$" and "$Y_n$", respectively, and substitutes "No Setting" for "h_flg [i]". Herein, the variable "n" is a value in a range of 1 to $X_{max}$, and the variable "i" is a value in a range of 1 to $Y_{max}$.

In step 302, the fingerprint image judgment program $12_1$ increases the value of the variable "n" by 1.

In step 303, the fingerprint sensor 15 stores the pixel values for the $n^{th}$ line in the Y-axis direction, out of the read fingerprint image data, at the address position V_r [i] on the first register memory $14_1$.

In step 304, the fingerprint image judgment program $12_1$ counts the number of ridges in the fingerprint image for the $n^{th}$ line in the Y-axis direction and substitutes the number for the variable "$Y_n$".

To be specific, similar to the method in the conventional fingerprint image judgment apparatus 10, a threshold value indicating a boundary between a ridge and a valley has been set previously. When the pixel value at the address position V_r [i] of the first register memory $14_1$ is equal to or more than the threshold value (valley), and when the pixel value at the address position V_r [i+1] of the first register memory $14_1$ is less than the threshold value (ridge), the fingerprint image judgment program $12_1$ judges that the pixel at the address position V_r [i+1] forms a ridge in the Y-axis direction.

The fingerprint image judgment program $12_1$ performs the above operation for all the pixel values of the $n^{th}$ line in the Y-axis direction, thus enabling counting the number of ridges in the fingerprint image for the $n^{th}$ line in the Y-axis direction.

In step 305, the fingerprint image judgment program $12_1$ increases the value of the variable "i" by only "1". In step 306, the fingerprint image judgment program $12_1$ judges whether or not the value of the flag h_flg [i] is a "valley".

When the value of the flag h_flg [i] is judged not to be a "valley" (NO) in step 306, the fingerprint image judgment program $12_1$ judges whether or not the pixel value at the address position V_r [i] is less than the threshold value in step 307.

When the pixel value at the address position V_r [i] is judged to be less than the threshold value (YES) in step 307, the operation advances to step 312. When the pixel value at the address position V_r [i] is judged not to be less than the threshold value (NO) in step 307, the operation advances to step 308.

In step 308, a "valley" is set at the value of the flag h_flg [i].

When the value of the flag h_flg [i] is judged to be a "valley" (YES) in step 306, the fingerprint image judgment program $12_1$ judges whether or not the pixel value at the address position V_r [i] is less than the threshold value in step 309.

When the pixel value at the address position V_r [i] is judged not to be less than the threshold value (NO) in step 309, the operation advances to step 312. When the pixel value at the address position V_r [i] is judged to be less than the threshold value (YES) in step 309, the operation advances to step 310.

In step 310, the fingerprint image judgment program $12_1$ increases the value of the variable "$X_i$", which indicates the number of ridges for $i^{th}$ line in the X-axis direction, by 1.

In step 311, the fingerprint image judgment program $12_1$ clears the value of the flag h_flg [i] (to be "No Setting").

In step 312, the fingerprint image judgment program $12_1$ judges whether or not the variable "i" is equal to or more than the value "$Y_{max}$".

When the variable "i" is equal to or more than the value "$Y_{max}$" (YES) in step 312, the fingerprint image judgment program $12_1$ judges that the count of the number of ridges for all the pixels in the Y-axis direction along the $n^{th}$ line in the Y-axis direction is finished, and the operation advances to step 313.

On the other hand, when the variable "i" is less than the value "$Y_{max}$" (NO) in step 312, the fingerprint image judgment program $12_1$ judges that the count of the number of ridges for the $n^{th}$ line in the Y-axis direction is not finished, and the operations from step 305 to step 311 are repeated for the $n^{th}$ line in the Y-axis direction.

In step 313, the fingerprint image judgment program $12_1$ judges whether or not the variable "n" is equal to or more than the numeric value "$X_{max}$".

When the variable "n" is equal to or more than the value "$X_{max}$" (YES) in step 313, the fingerprint image judgment program $12_1$ judges that the count of the number of ridges for all the pixels along all the lines in the X-axis and Y-axis directions is finished, and the operation advances to step 314.

As a result, the variables "$X_i$" of $Y_{max}$, which indicates the number of ridges for one line in the X-axis direction in the fingerprint image, and the variables "$Y_n$" of $X_{max}$, which indicates the number of ridges for one line in the Y-axis direction can be obtained.

On the other hand, when the variable "n" is less than the numeric value "$X_{max}$" (NO) in step 313, the fingerprint image judgment program $12_1$ judges that the count of the number of ridges for all the lines in the X-axis and Y-axis directions is not finished, and the operations from step 305 to step 312 are repeated.

In step 314, the fingerprint image judgment program $12_1$ judges whether or not the values of the variables "$Y_n$" and "$X_i$" are in a predetermined range, respectively.

Specifically, when the values of the variables "$Y_n$" and "$X_i$" are in the predetermined range, the fingerprint image data is judged to have been correctly read by the fingerprint sensor 15 (normal end), and when the values of the variables "$Y_n$" and "$X_i$" are not in the predetermined range, the fingerprint image data is judged not to have been correctly read by the fingerprint sensor 15 (abnormal end).

Herein, the predetermined range is decided based on a sensitivity of the fingerprint sensor 15 and the like.

Operation/Effect of the Fingerprint Image Judgment Apparatus According to This Embodiment In the fingerprint image judgment apparatus 10 according to this embodiment, the first register memory $14_1$ stores the pixel values along one line in the Y-axis direction, and the second register memory $14_2$ stores the value of the flag h_flg [i]. Thus, even when a CPU having a small utilizable memory space is used, judgment of whether or not the fingerprint image data has been correctly read can be made.

MODIFIED EXAMPLE 1

Instead of counting the number of ridges along one line in the Y-axis direction, after the fingerprint image data for one line in the Y-axis direction has been stored in the first register memory $14_1$ as in the fingerprint image judgment apparatus 10 according to the above-described embodiment, a fingerprint image judgment apparatus 10 according to a modified example of the present invention is characterized in that the number of ridges along one line in the Y-axis direction and the number of ridges along one line in the X-axis directions are counted each time one pixel value of the fingerprint image data for one line in the Y-axis direction is read.

Figure 9:
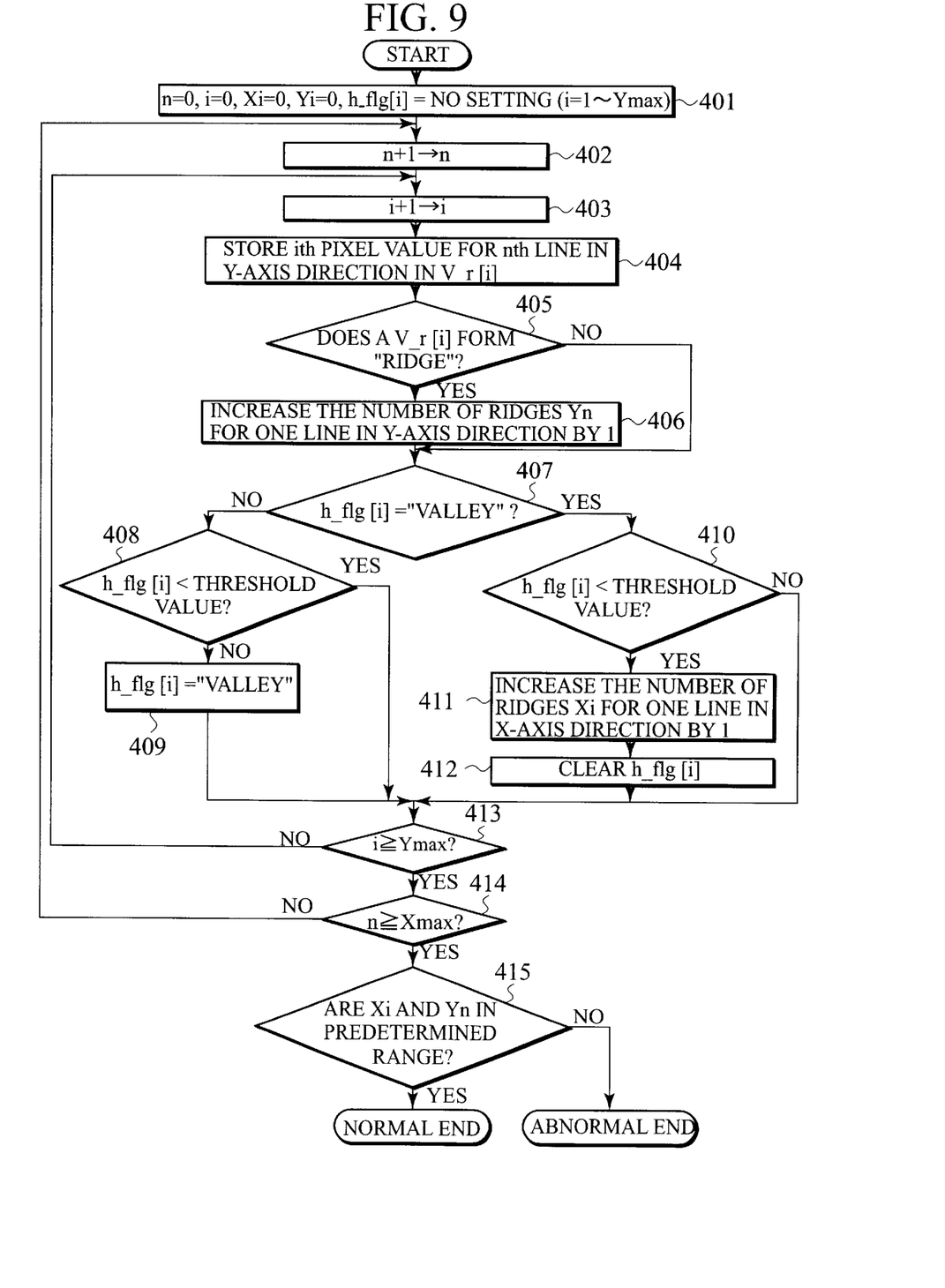
FIG. 9 is a flowchart illustrating an operation in which a fingerprint image judgment apparatus according to one modified example of the present invention judges whether or not the fingerprint image data has been correctly read.

An operation of the fingerprint image judgment apparatus 10 according to this modified example will be described with reference to the drawing. FIG. 9 is a flowchart illustrating an operation in which the fingerprint image judgment apparatus 10 according to this modified example judges whether or not the fingerprint image data has been correctly read.

As shown in FIG. 9, in step 401, the fingerprint image judgment program $12_1$ initializes variables "n", "i", "$X_i$", "$Y_n$" and "h_flg [i]".

To be specific, the fingerprint image judgment program $12_1$ substitutes a numeric value "0" for "n", "i", "$X_i$" and "$Y_n$", respectively, and substitutes "No Setting" for "h_flg [i]". Herein, the variable "n" is a value in the range of 1 to $X_{max}$, and the variable "i" is a value in the range of 1 to $Y_{max}$.

In step 402, the fingerprint image judgment program $12_1$ increases the value of the variable "n" by 1.

In step 403, the fingerprint image judgment program $12_1$ increases the value of the variable "i" by 1.

In step 404, the fingerprint sensor 15 stores the $i^{th}$ pixel value of the $n^{th}$ line in the Y-axis direction, from the read fingerprint image data, at the address position V_r [i] on the first register memory $14_1$.

In step 405, the fingerprint image judgment program $12_1$ judges whether or not the pixel value at the address position V_r [i] on the first register memory $14_1$ forms a ridge in the Y-axis direction.

For example, a first threshold value indicating a boundary between a ridge and a valley in the Y-axis direction is set in advance. When a pixel value at an address position V_r [i–1] is equal to or more than the first threshold value and when the pixel value at the address position V_r [i] is less than the first threshold value, the fingerprint image judgment program $12_1$ judges that the pixel at the address position V_r [i] forms a ridge in the Y-axis direction.

When the pixel value at the address position V_r [i] is judged to form a ridge in the Y-axis direction (YES) in step 405, the operation advances to step 406. When the pixel value at the address position V_r [i] is judged not to form a ridge in the Y-axis direction (NO) in step 405, the operation advances to step 407.

In step 406, the fingerprint image judgment program $12_1$ increases, by 1, the value of the variable "$Y_n$" indicating the number of ridges along the $n^{th}$ line in the Y-axis direction.

In step 407, the fingerprint image judgment program $12_1$ judges whether or not the value of the flag h_flg [i] is a "valley".

When the value of the flag h_flg [i] is judged not to be a "valley" (NO) in step 407, the fingerprint image judgment program $12_1$ judges whether or not the pixel value at the address position V_r [i] is less than a second threshold value in the X-axis direction in step 408.

When the pixel value at the address position V_r [i] is judged to be less than the second threshold value (YES) in step 408, the operation advances to step 413. When the pixel value at the address position V_r [i] is judged not to be less than the second threshold value (NO) in step 408, the operation advances to step 409.

In step 409, the fingerprint image judgment program $12_1$ sets a "valley" as the value of the flag h_flg [i].

When the value of the flag h_flg [i] is judged to be a "valley" (YES) in step 407, the fingerprint image judgment program $12_1$ judges whether or not the pixel value at the address position V_r [i] is less than the second threshold value in step 410.

When the pixel value at the address position V_r [i] is judged not to be less than the second threshold value (NO) in step 410, the operation advances to step 413. When the pixel value at the address position V_r [i] is judged to be less than the second threshold value (YES) in step 410, the operation advances to step 411.

In step 411, the fingerprint image judgment program $12_1$ increases, by 1, the value of the variable "$X_i$" indicating the number of ridges for the $i^{th}$ line in the X-axis direction.

In step 412, the fingerprint image judgment program $12_1$ clears the value of the flag h_flg [i] (to be "No Setting").

In step 413, the fingerprint image judgment program $12_1$ judges whether or not the variable "i" is equal to or more than the value "$Y_{max}$".

When the variable "i" is equal to or more than the numeric value "$Y_{max}$" (YES) in step 413, the fingerprint image judgment program $12_1$ judges that the count of the number of ridges for all the pixels in the Y-axis direction along the $n^{th}$ line in the Y-axis direction is finished, and the operation advances to step 414.

On the other hand, when the variable "i" is less than the value "$Y_{max}$" (NO) in step 413, the fingerprint image judgment program $12_1$ judges that the count of the ridges along the $n^{th}$ line in the Y-axis direction is not finished, and the operations from step 403 to step 412 are repeated for the $n^{th}$ line in the Y-axis direction.

In step 414, the fingerprint image judgment program $12_1$ judges whether or not the variable "n" is equal to or more than the value "$X_{max}$".

When the variable "n" is equivalent to the value or more "$X_{max}$" (YES) in step 414, the fingerprint image judgment program $12_1$ judges that the count of the number of ridges for all the pixels along all the lines in the X-axis and Y-axis directions is finished, and the operation advances to step 415.

As a result, the variables "$X_i$" of $Y_{max}$ indicating the number of ridges for one line in the X-axis direction in the fingerprint image, and the variables "$Y_n$" of $X_{max}$ indicating the number of ridges for one line in the Y-axis direction can be obtained.

Meanwhile, when the variable "n" is less than the value "$X_{max}$" (NO) in step 414, the fingerprint image judgment program $12_1$ judges that the count of the ridges for all the lines in the X-axis and Y-axis directions is not finished, and the operations from step 402 to step 413 are repeated.

In step 415, the fingerprint image judgment program $12_1$ judges whether or not the values of the variables "$Y_n$" and "$X_i$" are in a predetermined range.

Specifically, when the values of the variables "$Y_n$" and "$X_i$" are in the predetermined range, the fingerprint image data is judged to have been correctly read by the fingerprint sensor 15 (normal end). On the other hand, when the values of the variables "$Y_n$" and "$X_i$" are not in the predetermined range, the fingerprint image data is judged not to have been correctly read by the fingerprint sensor 15 (abnormal end). Herein, the predetermined range is decided based on the sensitivity of the fingerprint sensor 15 and the like.

According to the fingerprint image judgment apparatus 10 of this modified example, respective memory sizes of the first and second register memories $14_1$ and $14_2$ can be set to $Y_{max}$ bytes or less.

MODIFIED EXAMPLE 2

The present invention can be applied even in the case where the X-axis and Y-axis are reversed in the fingerprint image judgment apparatus 10 according to the above-described embodiment and modified example 1.

In such a case, the first register memory $14_1$ is a place where fingerprint image data for one line in the X-axis direction is temporarily stored, the fingerprint image data being read by use of the fingerprint sensor 15, and the second register memory $14_2$ is a place where a flag h_flg [i] indicating whether or not each pixel of the fingerprint image data for one line in the X-axis direction forms a valley is temporarily stored, the fingerprint image data being read by use of the fingerprint sensor 15.

Moreover, the present invention can be applied to the case where the ridge and the valley are reversed in the fingerprint image judgment apparatus 10 according to the above-described embodiment and modified example 1.

Note that, in a computer 30, a program for executing functions of the fingerprint image judgment apparatus according to this embodiment (hereinafter referred to as a fingerprint image judgment program) can be recorded in a computer-readable recording medium.

Figure 10:
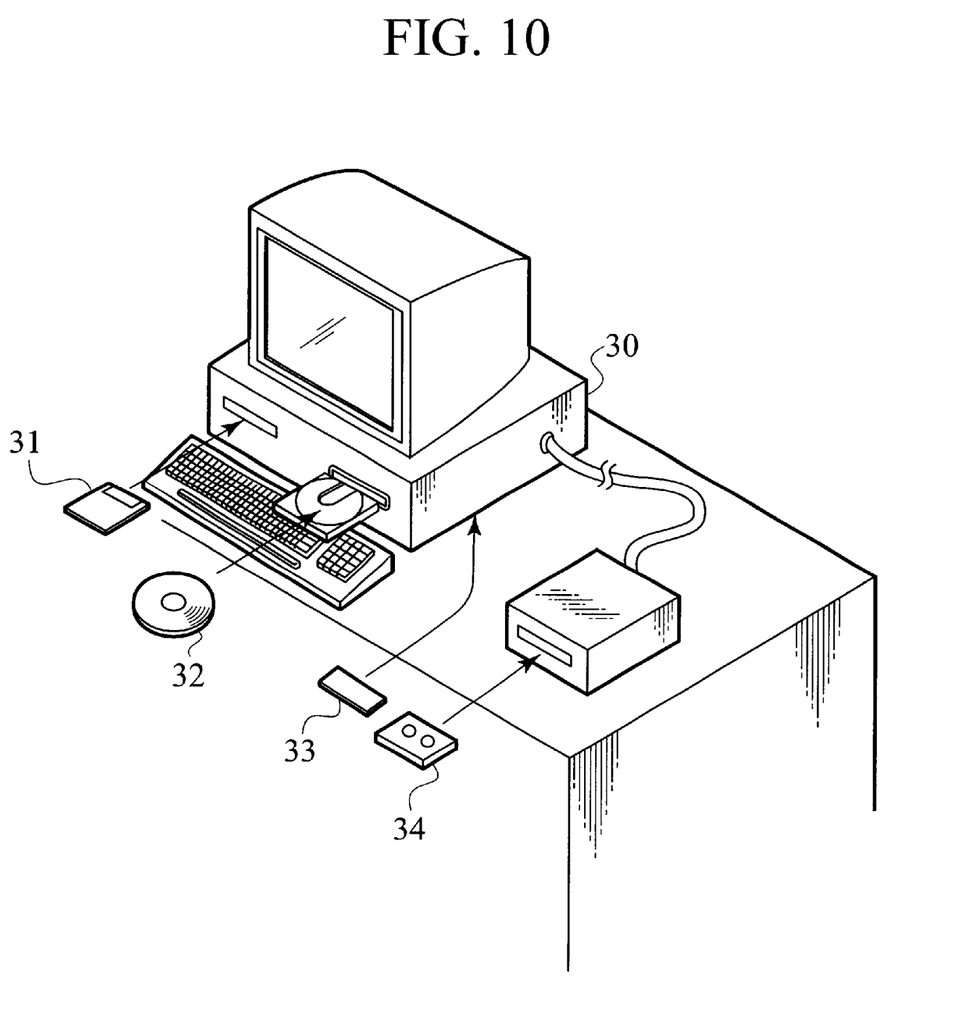
FIG. 10 is a view showing a computer-readable recording medium recording a fingerprint image judgment program according to one embodiment of the present invention.

As shown in FIG. 10, examples of computer-readable recording medium including a floppy disk 31, a compact disc 32, an IC chip 33, a cassette tape 34 and the like are given. Because a computer-readable recording medium stores such a fingerprint image judgment program, the fingerprint image judgment program is able to be easily stored transferred, sold and the like.

According to the present invention, the fingerprint image judgment apparatus and its program can be provided, the apparatus enabling judgment of whether or not the fingerprint image data has been correctly read even when a CPU having a small utilizable memory space is used.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A fingerprint image judgment apparatus which judges whether or not fingerprint image data composed of a plurality of pixel values indicating contrast information of pixels has been correctly read by a fingerprint sensor, comprising:

a first memory for storing the pixels values of a predetermined number;

a formation judgment unit for judging whether or not the pixel values form any one of ridges and valleys in any one direction of the X-axis and Y-axis directions in the fingerprint image data;

a second memory for storing a judgment result judged by the formation judgment unit;

a storage unit for sequentially storing the pixel values of the fingerprint image data in the first memory at intervals of a predetermined number, the fingerprint image data being read by the fingerprint sensor along one of the directions;

a first count unit for counting any one of the number of ridges and valleys in said one of the directions based on the pixel values stored in the first memory;

a second count unit for counting any one of the number of ridges and valleys in the other direction of the X-axis and Y-axis directions, based on the judgment result stored in the second memory and the pixel values stored in the first memory; and a correctibility judgment unit for judging whether or not the fingerprint image data has been correctly read by the fingerprint sensor, based on any one of the number of ridges and valleys counted by the first count unit and any one of the number of ridges and valleys counted by the second count unit with respect to the entire fingerprint image data.

2. The fingerprint image judgment apparatus according to claim 1, wherein the first memory stores the pixel values for one line in said one of the directions, the second memory stores the judgment result for one line in said one of the directions, the storage unit sequentially stores the pixel values in the first memory for each line in said one of the directions, and the first count unit counts any one of the number of ridges and valleys in said one of the directions along each line in said one of the directions.

3. The fingerprint image judgment apparatus according to claim 1, wherein the storage unit sequentially stores the pixel values in the first memory for each pixel along said one of the directions, the first count unit counts any one of the number of ridges and valleys in said one of the directions for each pixel, and the second count unit counts any one of the number of ridges and valleys in said other direction for each pixel.

4. The fingerprint image judgment apparatus according to claim 1, wherein the formation judgment unit judges whether or not the pixel values form any one of ridges and valleys in any one direction of X-axis and Y-axis directions in the fingerprint image data, by comparing the pixel values stored in the first memory with a first threshold value.

5. The fingerprint image judgment apparatus according to claim 1, wherein the second count unit increases the number of ridges in said other direction by 1, in the case where the judgment result stored in the second memory forms a valley and where the pixel values stored in the first memory are less than a second threshold value.

6. The fingerprint image judgment apparatus according to claim 1, wherein the second count unit increases the number of valleys in said other direction by 1, in the case where the judgment result stored in the second memory forms a ridge and where the pixel values stored in the first memory are equal to or more than a second threshold value.

7. A program product for allowing a computer to function as a fingerprint image judgment apparatus which judges whether or not fingerprint image data composed of a plurality of pixel values indicating contrast information of pixels has been correctly read by a fingerprint sensor, comprising:

a formation judgment unit for judging whether or not the pixel values stored in a first memory form any one of ridges and valleys in any one direction of the X-axis and Y-axis directions in the fingerprint image data and for storing the judgment result in a second memory;

a storage unit for sequentially storing the pixel values of the fingerprint image data in the first memory at intervals of a predetermined number, the fingerprint image data being read by the fingerprint sensor along said one of the directions;

a first count unit for counting any one of the number of ridges and valleys in said one of the directions based on the pixel values stored in the first memory;

a second count unit for counting any one of the number of ridges and valleys in the other direction of the X-axis and Y-axis directions, based on the judgment result stored in the second memory and the pixel values stored in the first memory; and a correctibility judgment unit for judging whether or not the fingerprint image data has been correctly read by the fingerprint sensor based on any one of the number of ridges and valleys counted by the first count unit and any one of the number of ridges and valleys counted by the second count unit with respect to the entire fingerprint image data.

8. The program product according to claim 7, wherein the first memory stores the pixel values for one line in said one of the directions, the second memory stores the judgment result for one line in said one of the directions, the storage unit sequentially stores the pixel values for each line in said one of the directions in the first memory, and the first count unit counts any one of the number of ridges and valleys in said one of the directions along each line in said one of the directions.

9. The program product according to claim 7, wherein the storage unit sequentially stores the pixel values in the first memory for each pixel along said one of the directions, the first count unit counts any one of the number of ridges and valleys in said one of the directions for each pixel, and the second count unit counts any one of the number of ridges and valleys in said other direction for each pixel.

10. The program product according to claim 7, wherein the formation judgment unit judges whether or not the pixel values form any one of the number of ridges and valleys in any one direction of the X-axis and Y-axis directions in the fingerprint image data, by comparing the pixel values stored in the first memory with a first threshold value.

11. The program product according to claim 7, wherein the second count unit increases the number of ridges in said other direction by 1, in the case where the judgment result stored in the second memory forms a valley and where the pixel values stored in the first memory are less than a second threshold value.

12. The program product according to claim 7, wherein the second count unit increases the number of valleys in said other direction by 1, in the case where the judgment result stored in the second memory forms a ridge and where the pixel values stored in the first memory are equal to or more than a second threshold value.

* * * * *